(12) United States Patent
Feng et al.

(10) Patent No.: US 9,213,690 B2
(45) Date of Patent: Dec. 15, 2015

(54) METHOD, SYSTEM, AND APPARTUS FOR SELECTING AN ACRONYM EXPANSION

(75) Inventors: Shicong Feng, Beijing (CN); Yuhong Xiong, Beijing (CN); Conglei Yao, Beijing (CN); Wei Liu, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 325 days.

(21) Appl. No.: 13/695,238

(22) PCT Filed: Apr. 29, 2010

(86) PCT No.: PCT/CN2010/000591
§ 371 (c)(1),
(2), (4) Date: Jan. 14, 2013

(87) PCT Pub. No.: WO2011/134104
PCT Pub. Date: Nov. 3, 2011

(65) Prior Publication Data
US 2013/0110500 A1  May 2, 2013

(51) Int. Cl.
| G06F 17/27 | (2006.01) |
| G06F 17/20 | (2006.01) |
| G06F 17/21 | (2006.01) |
| G06F 17/28 | (2006.01) |
| G06F 17/22 | (2006.01) |

(52) U.S. Cl.
CPC ............ *G06F 17/28* (2013.01); *G06F 17/2282* (2013.01); *G06F 17/277* (2013.01)

(58) Field of Classification Search
CPC ........................................................ G06F 17/02
USPC ................................................... 704/1, 9, 10
See application file for complete search history.

(56) References Cited

U.S. PATENT DOCUMENTS

| 6,385,629 B1 | 5/2002 | Sundaresan et al. |
| 7,028,038 B1 * | 4/2006 | Pakhomov .................... 707/765 |

(Continued)

FOREIGN PATENT DOCUMENTS

CN   101561813   10/2009

OTHER PUBLICATIONS

Feng et al. "Acronym Extraction and Disambiguation in Large-scale Organizational Web Pages". Proceedings of the 18th ACM conference on Information and knowledge management, Nov. 6, 2009, pp. 1693-1696.*

(Continued)

*Primary Examiner* — Jesse Pullias
(74) *Attorney, Agent, or Firm* — Hewlett Packard Enterprise Patent Department

(57) ABSTRACT

According to one embodiment of the present invention, there is provided a method of selecting an expansion for an acronym in a document of a set of linked documents. The method comprises obtaining for each occurrence of the acronym in the set of linked documents one or more possible acronym expansions and an associated probability that the one or more possible acronym expansions is the correct acronym expansion. The further comprises identifying a sub-set of documents from the set of linked documents in which the acronym occurs. The method further comprises recalculating the associated probabilities for a first occurrence of an acronym in the sub-set of documents based, in part, on the associated probabilities of other occurrences of the acronym in the sub-set of documents and the distance between the first occurrence and the other occurrences.

20 Claims, 3 Drawing Sheets

(56) References Cited

U.S. PATENT DOCUMENTS

| | | |
|---|---|---|
| 7,236,923 B1 | 6/2007 | Gupta |
| 7,536,297 B2 | 5/2009 | Byrd et al. |
| 8,364,470 B2 * | 1/2013 | Abraham et al. ............. 704/9 |
| 2003/0018670 A1 * | 1/2003 | Ashford et al. ............. 707/532 |
| 2004/0215726 A1 * | 10/2004 | Arning et al. ............. 709/206 |
| 2006/0173668 A1 * | 8/2006 | Haigh et al. ............. 703/17 |
| 2007/0174045 A1 * | 7/2007 | Kao et al. ............. 704/4 |
| 2008/0033714 A1 | 2/2008 | Gupta |
| 2008/0086297 A1 | 4/2008 | Li et al. |
| 2009/0006359 A1 * | 1/2009 | Liao ............. 707/5 |
| 2009/0259629 A1 | 10/2009 | Wei et al. |

OTHER PUBLICATIONS

Shicong Feng, et al.; "Acronym Extraction and Disambiguation in Large Scale Organizational Web pages"; Nov. 6, 2009; Proceedings of the 18th ACM Conference on Information and Knowledge Management: CIKM.

International Searching Authority, The International Search Report and the Written Opinion, Feb. 10, 2011, 11 Pages.

Manuel Zahariev, Efficient Acronym-Expansion Matching for Automatic Acronym Acquisition (Research Paper), Retrieved Feb. 17, 2010, 6 Pages.

* cited by examiner

METHOD, SYSTEM, AND APPARTUS FOR SELECTING AN ACRONYM EXPANSION

BACKGROUND

Acronyms are used widely in all kinds of writing as a convenient shorthand way of representing often word phrases, company names, chemical names, etc.

Many acronyms have become so familiar that generally people understand to what the acronym refers but may not actually know what the acronym stands for. In many cases an acronym may have a different expansion depending on the context in which the acronym is used.

According to well established writing conventions acronyms should be introduced along with their accompanying acronym expansion the first time an acronym is used in a text. If such conventions are not adhered to readers may have difficulty understanding an acronym, especially if the acronym is not one the reader is familiar with or if the acronym has more than one possible acronym expansion depending on the context in which the acronym is used.

Increasing amounts of information and documentation are available, for example, through web pages accessible over the Internet. However, much of this documentation is not written according to well established writing conventions. Accordingly, the understanding of acronyms within such documentation may be particularly problematic.

BRIEF DESCRIPTION

Embodiments of the invention will now be described, by way of non-limiting example only, with reference to the accompanying drawings, in which.

DETAILED DESCRIPTION

Figure 1:
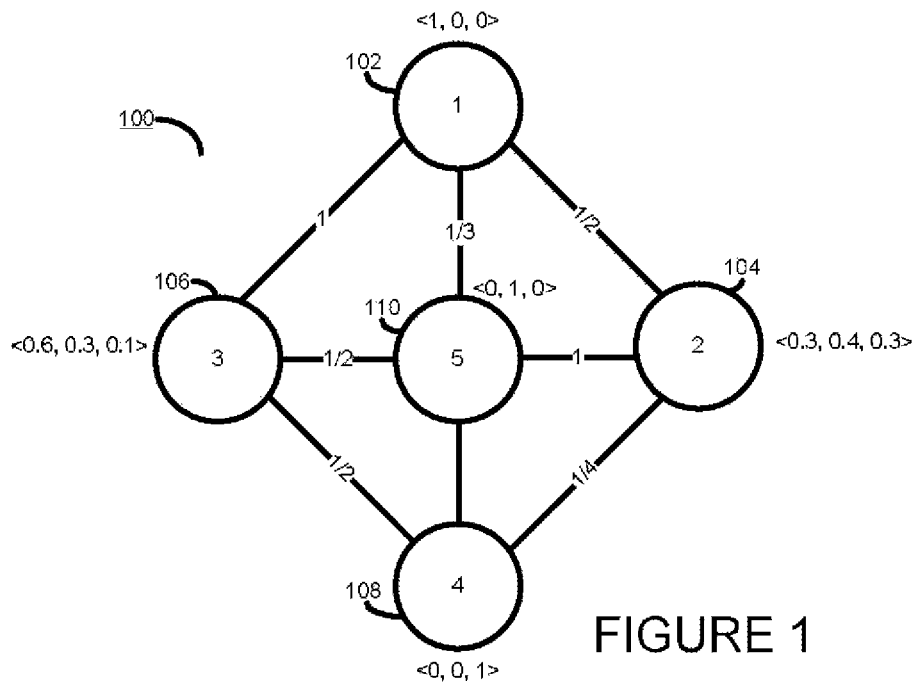
FIG. 1 is an illustration of an example acronym graph according to an embodiment of the present invention.

Embodiments of the present invention provide a method and system for performing acronym disambiguation in documents from a set of linked documents, such as within web pages of a web site. By disambiguation is meant identifying the most appropriate acronym expansion for an acronym where multiple acronym expansions exist. Advantageously, the present embodiments perform acronym disambiguation without any linguistic analysis of the context in which the acronyms occur. This is particularly advantageous, as will be appreciated further below, since linguistic analysis is a complex and processor intensive operation.

Large web sites, such as corporate web sites, may comprise many thousands of web pages covering many different domains. It is therefore common for an acronym to be used in different ones of the web pages, with the correct acronym expansion depending on the particular context. For example, within an engineering context the acronym expansion of 'TCP' may include 'Transmission Control Protocol', 'Trusted Computer Platform', or 'Telephony Control Protocol', depending on the particular domain. In a human resources context TCP may stand for 'Technical Career Path'. If acronyms and their associated acronym expansions are not presented in the same web page it may be difficult for a reader to determine the correct acronym expansion for a given acronym.

Numerous techniques are known for extracting acronyms and acronym expansions from documents such as web pages. Such techniques include analysing a web page and identifying words composed entirely of capital letters preceded or followed by a phrase in parenthesis. Such techniques may be performed, for example, on each web page of a web site to produce a list of acronyms and related expansions. Filtering may also be performed to remove any mark-up language or tags from the web page.

Within a web page an acronym may be determined as being unambiguous if a corresponding expansion is identified within the same web page, or if an acronym only has a single expansion throughout the all of the web pages of the web site. An acronym may be determined as being ambiguous within a web page if, for example, no acronym expansion is identified in the web page and if more than one possible expansion is identified across all the web pages of the web site.

It is generally known to perform acronym disambiguation by performing a content or context-based analysis or classification. Such techniques are described, for example, in H. Yu, W. Kim, V. Hatzivassiloglou, and W. J. Wilbur "A large scale, corpus-based approach for automatically disambiguating biomedical abbreviations", published in *ACM Transactions on Information System (TOIS)*, Vol. 24, No. 3, July 2006, pp 380-404 and which is incorporated, by reference, in its entirety. These techniques enable a probability to be assigned to each acronym expansion for an ambiguous acronym. The assigned probability indicates a probability that an acronym expansion is the correct expansion for a given ambiguous acronym in a given web page.

Content-based analysis derives, for each acronym V in a web site, or set of documents, an acronym tuple $V_i$, which defines the probabilities of each acronym expansion being the correct expansion for an acronym V in a given instance i such as a web page.

$$V_i = <W_1, W_2, W_3, \ldots, W_N>$$

where $W_k$ represents the probability of each expansion $E_k$ being the correct expansion for the instance i within the web site, the value of $W_k$ being assigned by a content-based classifier. The values of $W_k$ may be suitably arranged to sum to one.

For example, given an acronym V with three possible expansions $E_1$, $E_2$, and $E_3$ throughout the web site, if no specific acronym expansion is given on a given web page, the acronym tuple $V_i$ for that instance may have been determined by the content-based analysis to have the acronym expansion probabilities:

$V_i = <0.6, 0.3, 0.1>$

If in a given instance the acronym expansion for acronym V is unambiguously determined to be expansion $E_1$, the acronym tuple $V_i$ may be given as:

$V_i = <1, 0, 0>$

Embodiments of the present invention aim to improve on content-based disambiguation techniques, as described in further detail below. The embodiments described herein make use of the realization that in a set of linked documents, such as pages of a web site, the distance from one web page to another, in terms of the number of links needed to navigate from one web page to another, may be particularly useful in determining the correct acronym expansion for an acronym.

For example, in a large corporate web site the subject matter of the web pages of the web site may differ. For example, a large corporate web site may contain sub-sets of pages relating to human resources, pages relating to finance, pages relating to engineering, and so on. Within each sub-set of pages the same acronym may be used but may have a different expansion depending on the particular context. For example, as previously mentioned, the acronym TCP may have the expansion "technical career path" in a human resources context, but may have the expansion "transport control protocol" in an engineering context.

For example, if a web page in a human resources part of the web site uses the acronym "TCP" it is more likely that the correct acronym expansion is "technical career path" rather than "transport control protocol". Accordingly, by using a weighting based on the distance between web pages enables more weight to be given to acronym expansions which are a shorter distance away from the web page containing the acronym.

Referring now to FIG. 1 is shown a diagram of an example acronym graph 100 according to an embodiment of the present invention. Further reference is made to FIG. 2, which is a simplified flow diagram outlining a method according to an embodiment of the present invention.

At 202 a sub-set of the set of linked documents in which the ambiguous acronym V occurs are identified. The sub-set of documents, which may comprise the whole set of linked documents, may be conveniently represented as a graph 100, as shown in FIG. 1.

The graph 100 shows a number of nodes 102, 104, 106, and 108, each of which represents a web page in which an acronym V is present. At each node the acronym tuple $V_i$ is obtained, for example, from an appropriate content-based analysis for that particular acronym instance. For example, in page 1, it can be seen that the acronym expansion $E_1$ is unambiguous ($V_i$=<1, 0, 0>), whereas in page 3 (node 106) it can be seen that the instance of acronym $V_{iP3}$ is ambiguous and has the tuple $V_{iP3}$=<0.6, 0.3, 0.1>.

The links between different nodes of the graph are weighted dependent on how the different web pages containing a given acronym instance are linked, for example through the inclusion of a hyperlink of other linking mechanism. The minimum number of links, or distance, required to be navigated through to go from one web page to another are determined and applied as a weighting to each link on the graph 100.

For example, web pages 1 (102) and 3 (106) are directly linked together giving a link value of '1'. Web pages 1 (102) and 2 (104) are indirectly linked, requiring a user to click or select two hyperlinks, and thus has a link value of '½' or 0.5. Web pages 2 (104) and 3 (106) are linked indirectly either through web page 1, 5, or 4, with the minimum distance of 3.

Figure 2:
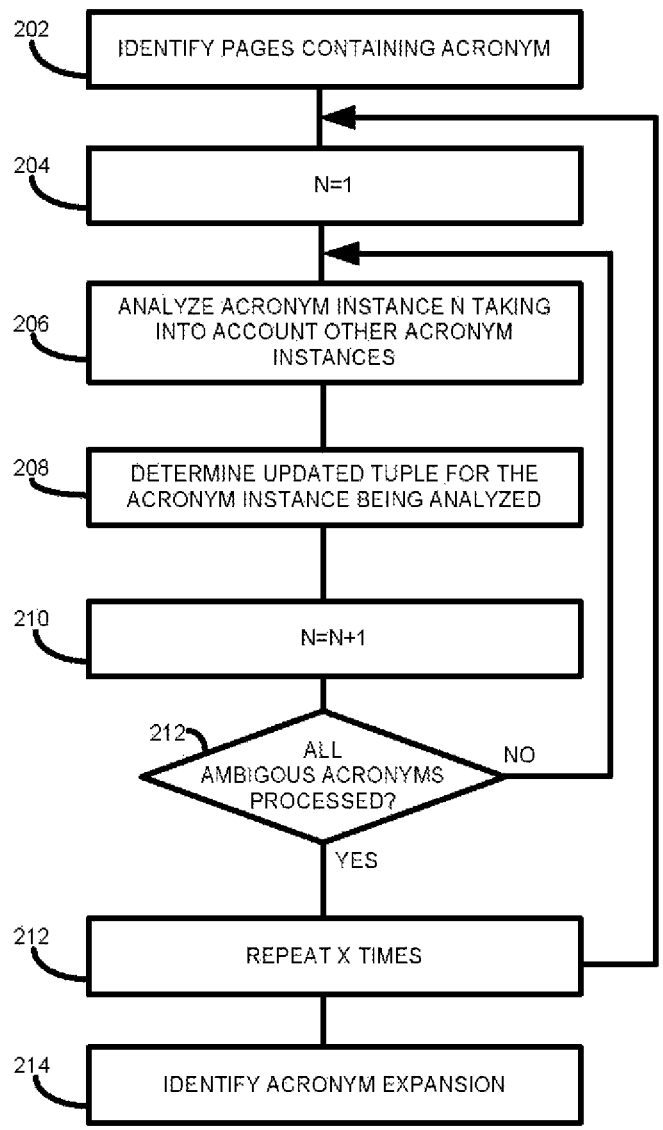
FIG. 2 is a flow diagram outlining an example method according to an embodiment of the present invention.

Each instance $V_i$ of the ambiguous acronym is analyzed to determine a value, as described below with further reference to FIG. 2. In the following example the acronym tuple $V_{iP2}$=<0.3, 0.4, 0.3> in web page 2 (104) is initially analyzed.

At 204 and 206 the first acronym instance $V_{iP2}$ is analyzed, taking into account the other acronym instances in the graph 100 and also the distance between the different instances, as will be described further below.

As a result of the analysis, an updated or recalculated acronym tuple $V_{i'P2}$ is determined (208).

At 210 and 212 the analysis is repeated for each ambiguous acronym instance within the graph 100. The previously updated or recalculated acronym tuples are used when updating or recalculating each tuple in an iterative manner.

Once all the ambiguous acronym instances have been analysed the process is repeated (212) a predetermined number of times. Again, the previously updated or recalculated acronym tuples are used when updating or recalculating each tuple in an iterative manner.

At 214 the acronym expansion having the greatest value is determined to be the correct expansion for the acronym instance V.

The process may then be repeated for all the ambiguous acronyms identified within the web site.

Figure 3:
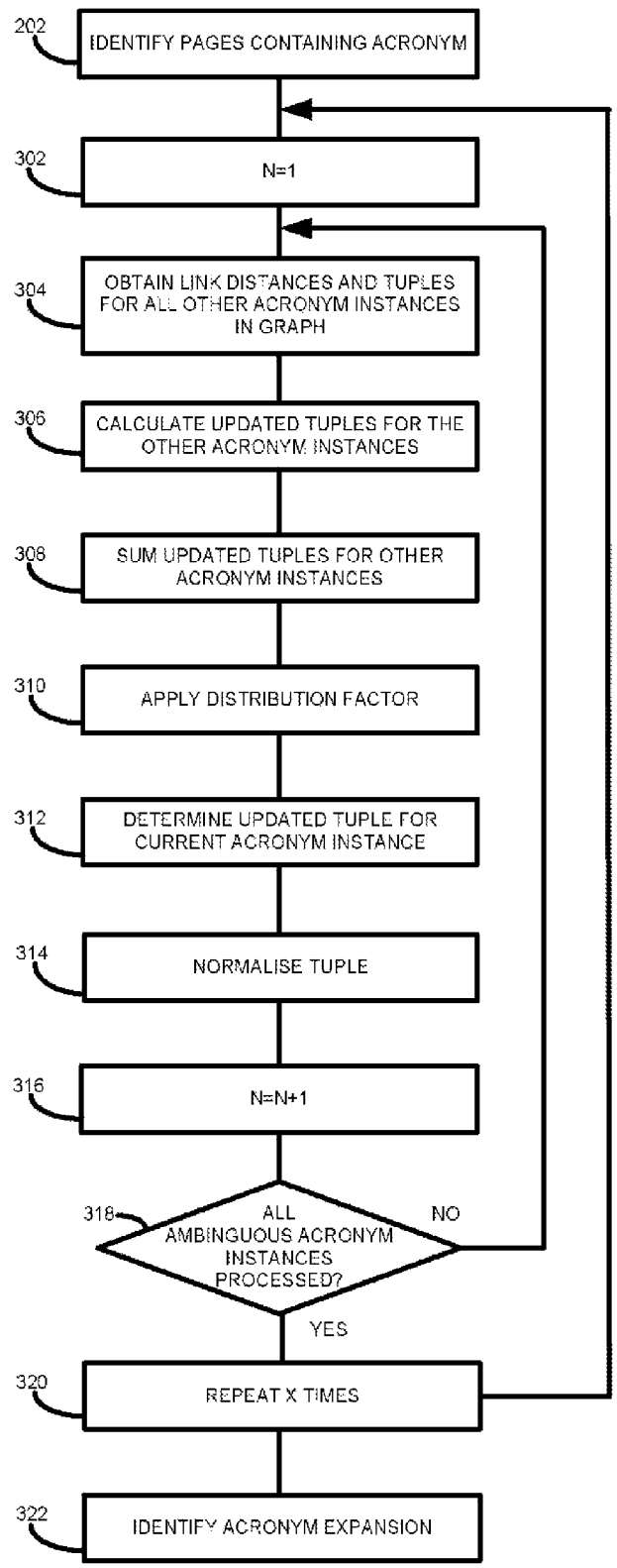
FIG. 3 is a flow diagram outlining an example method according to an embodiment of the present invention.

A more detail operation of the above-described method according to an embodiment is given below with further reference to FIG. 3.

At 202 a graph 100 for an ambiguous acronym V is constructed or is otherwise determined.

At 302 and 304 an updated tuple for the first instance (N=1) $V_i$ of the acronym V is determined by obtaining the tuples for the other acronym instances $V_j$ in the graph 100 along with their corresponding distance D to the web page of the current instance:

$V_{jP1}$=<1, 0, 0>, $D_{(2\ to\ 1)}$=0.5
$V_{jP3}$=<0.6, 0.3, 0.1>, $D_{(2\ to\ 3)}$=0.33
$V_{jP4}$=<0, 0, 1>, $D_{(2\ to\ 4)}$=0.25
$V_{jP5}$=<0, 1, 0>, $D_{(2\ to\ 5)}$=1

At 306 the other acronym tuples are then multiplied by their respective distances to give updated acronym tuples:

$V_{j'P1}$=<0.5, 0, 0>
$V_{j'P3}$=<0.2, 0.1, 0.03>
$V_{j'P4}$=<0, 0, 0.25>
$V_{j'P5}$=<0, 1, 0>

At 308 the updated acronym tuples are summed:

$V_{iSUM}$=$V_{j'P1}$+$V_{j'P3}$+$V_{j'P4}$+$V_{j'P5}$=<0.7, 1.1, 0.28>

At 310, $V_{iSUM}$ is multiplied by a damping factor (1-α). The purpose of the distribution factor is to adjust the value of $V_{iSUM}$ depending on different requirements. In the present embodiment α=0.2, although in other embodiments other values may be chosen.

$V_{iSUM}$=(1−0.2)*<0.7, 1.1, 0.28>=<0.56, 0.88, 0.22>

At 312 an updated tuple for the current acronym instance is determined by summing α*$V_i$ and $V_{iSUM}$ $V_{i'P2}$=0.2*<0.3, 0.4, 0.3>+<0.62, 0.88, 0.22>=<0.46, 0.96, 0.28>

At 314, $V_{i'P2}$ is normalized to <0.27, 0.56, 0.16> such that the sum of the probabilities equals 1.

The process is repeated at 316 and 318 until all of the acronym instances in the graph 100 have been processed. Each acronym instance is processed using the previously determined normalised acronym tuples calculated in 314.

Once each of the acronym instances have been processed (318), the whole process is repeated (320) a predetermined number of times in an iterative manner using the previously calculated normalised tuples. As the process is repeated the normalised tuples for each ambiguous acronym instance converge to a stable result. In one embodiment the process is repeated in the order of 50 to 60 times. In other embodiments the process may be repeated a greater or lesser number of times depending on particular requirements, such as available processing power, time available, etc.

At 322 the acronym expansion having the highest score, in this case $E_2$, having a value of 0.56 is determined as being the correct acronym expansion for the acronym instance $V_i$ in web page 2.

The above process can be more conveniently described by the following formula:

$$V_i = \alpha * V_i + (1 - \alpha) * \sum_{j \in N} \frac{V_j}{|d_{ij}|} \quad (1)$$

Where $V_i$ and $V_j$ are two acronym tuples and j is a neighbor of i and its tuple is $V_j$, and $|d_{ij}|$ is the distance between i and j, and $0 \le \alpha \le 1$.

Once the assumed correct acronym expansion has been selected (214, 322) a number of actions may be taken. For example, in one embodiment the acronym expansion may be automatically inserted into the web page in which the acronym occurs. In another embodiment a web browser plug-in application may be used to display the identified acronym expansion when a user selects or moves a pointer over the acronym.

Figure 4:
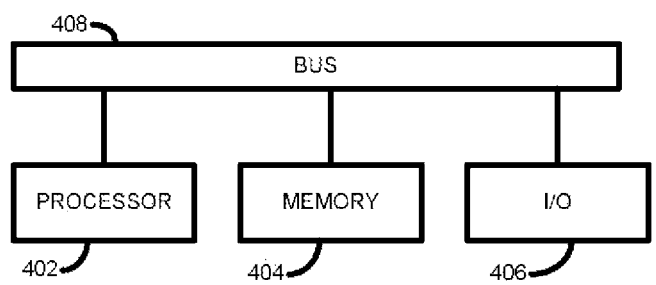
FIG. 4 is a simplified diagram of an example processing system for executing a method according to an embodiment of the present invention.

Referring now to FIG. 4 there is shown a block diagram of an embodiment of a processing system 400 which may be used to implement an acronym disambiguation method according as described above. The processing system 400 may comprise, for example, a micro processor, micro controller, or processing logic 402 for executing machine or computer-readable instructions stored in a memory 404. The machine-readable instructions may, when executed by the processor 402, perform method steps, such as those described above. Input and output operations may be handled by an I/O module 406. The processor 402, memory 404, and I/O interface 406 are coupled via a bus 408.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A method of selecting an expansion for an acronym in a document of a set of linked documents, the method comprising:
    obtaining for each occurrence of the acronym in the set of linked documents one or more possible acronym expansions and an associated probability that the one or more possible acronym expansions is the correct acronym expansion;
    identifying a sub-set of documents from the set of linked documents in which the acronym occurs;
    recalculating the associated probabilities for a first occurrence of an acronym in the sub-set of documents based, in part, on the associated probabilities of other occurrences of the acronym in the sub-set of documents and the distance between the first occurrence and the other occurrences;
    normalizing the recalculated associated probabilities for the first occurrence such that the sum of the recalculated associated probabilities equals one; and
    iteratively recalculating the associated probabilities for the first occurrence of the acronym using any previously recalculated associated probabilities of the other occurrences of the acronym.

2. The method of claim 1, further comprising, recalculating the associated probabilities for the other occurrences of the acronym using any previously recalculated associated probabilities.

3. The method of claim 2, further comprising iteratively recalculating a predetermined number of times the associated probabilities for all of the occurrences of the acronym, each time using the previously recalculated associated probabilities.

4. The method of claim 1, further comprising, selecting the acronym expansion having the highest recalculated probability as the correct acronym expansion.

5. The method of claim 4, further comprising modifying the document in which the first occurrence of acronym occurs to include the selected acronym expansion.

6. The method of claim 1, wherein the distance is the minimum number of links required to navigate from a document comprising the first occurrence and a document comprising a different occurrence of the same acronym.

7. The method of claim 1, wherein each document is a web page, and wherein the set of documents is a web site.

8. The method of claim 1, wherein the step of recalculating the associated probabilities for the first occurrence of the acronym further comprises performing the equation:

$$V_i = \alpha * V_i + (1-\alpha) * \sum_{j \in N} \frac{V_j}{|d_{ij}|} \qquad (1)$$

Where $V_i$ and $V_j$ are two acronym tuples and $V_j$ is another instance of the acronym $V_i$, where $|d_{ij}|$ is the linkable distance between instances $V_i$ and $V_j$, where $0 \le \alpha \le 1$.

9. The method of claim 1, wherein the step of obtaining comprises obtaining the probabilities using a content-based analysis technique.

10. The method of claim 1, further comprising iteratively recalculating a predetermined number of times the associated probabilities for all of the occurrences of the acronym until each ambiguous acronym converges to a stable result.

11. A computing device, comprising:
    a processor,
    a memory in communication with the processor, and
    computer executable instructions stored in the memory and executable on the processor to determine an acronym expansion of an acronym in a web page of a web site by:
        obtaining, through a content-based analysis, for each occurrence of the acronym in the web site, one or more possible acronym expansions and an associated probability that the one or more acronym expansions is the correct acronym expansion;
        identifying a set of web pages from the web site in which the acronym occurs;

calculating a new set of probabilities for a first occurrence of the acronym in the identified set of web pages, the calculation being made in part based on the associated probabilities of other occurrences of the acronym in other ones of the set of web pages and the number of links linking the other ones of the set of web pages;

normalizing the new set of probabilities for the first occurrence such that the sum of the recalculated associated probabilities equals one; and iteratively recalculating the associated probabilities for the first occurrence of the acronym using any previously recalculated associated probabilities of the other occurrences of the acronym.

12. The computing device of claim 11, further comprising iteratively recalculating at least 50 times the associated probabilities for all of the occurrences of the acronym, each time using the previously normalized recalculated associated probabilities.

13. The computing device of claim 11, further comprising computer executable instructions stored in the memory and executable on the processor to determine an acronym expansion of an acronym in a web page of a website by modifying the document in which the first occurrence of acronym occurs to include the selected acronym expansion.

14. The computing device of claim 11, further comprising computer executable instructions stored in the memory and executable on the processor to determine an acronym expansion of an acronym in a web page of a website by selecting the acronym expansion having the highest recalculated probability as the correct acronym expansion.

15. A non-transitory machine-readable storage carrying computer-implementable instructions that, when interpreted by a computer, cause the computer to:

obtain for each occurrence of the acronym in the set of linked documents one or more possible acronym expansions and an associated probability that the one or more possible acronym expansions is the correct acronym expansion;

identify a sub-set of documents from the set of linked documents in which the acronym occurs;

recalculate the associated probabilities for a first occurrence of an acronym in the sub-set of documents based, in part, on the associated probabilities of other occurrences of the acronym in the sub-set of documents and the distance between the first occurrence and the other occurrences;

normalize the recalculated associated probabilities for the first occurrence such that the sum of the recalculated associated probabilities equals one; and iteratively recalculate the associated probabilities for the first occurrence of the acronym using any previously recalculated associated probabilities of the other occurrences of the acronym.

16. The method of claim 1, further comprising, recalculating the associated probabilities for the other occurrences of the acronym using any previously normalized recalculated associated probabilities.

17. The method of claim 16, further comprising iteratively recalculating a predetermined number of times the associated probabilities for all of the occurrences of the acronym, each time using the previously normalized recalculated associated probabilities.

18. The method of claim 17, wherein the predetermined number of times is based on at least one of available processing power and time available.

19. The machine-readable storage of claim 15, further comprising computer-implementable instructions that, when interpreted by a computer, cause the computer to display the identified acronym expansion when a user selects the acronym.

20. The machine-readable storage of claim 15, further comprising computer-implementable instructions that, when interpreted by a computer, cause the computer to insert the acronym expansion into the web page in which the acronym occurs.

* * * * *